US005635564A

United States Patent [19]

Wieditz et al.

[11] Patent Number: 5,635,564

[45] Date of Patent: Jun. 3, 1997

[54] PREPARATION OF A MULTICOAT COATING, WATER-THINNABLE COATING COMPOSITIONS, WATER-THINNABLE EMULSION POLYMERS AND PREPARATION OF WATER-THINNABLE EMULSION POLYMERS

[75] Inventors: Stefan Wieditz, Sylvania, Ohio; Jürgen Niemann, Würzburg; Arnold Dobbelstein, Münster, both of Germany

[73] Assignee: BASF Lacke + Farben, AG, Muenster-Hiltrup, Germany

[21] Appl. No.: 265,571

[22] Filed: Jun. 24, 1994

Related U.S. Application Data

[63] Continuation of Ser. No. 679,071, filed as PCT/EP89/01434, Nov. 27, 1989 abandoned.

[30] Foreign Application Priority Data

Dec. 9, 1988 [DE] Germany .......................... 38 41 540.2

[51] Int. Cl.$^6$ ...................................................... C08L 33/04

[52] U.S. Cl. .......................... 525/194; 525/162; 525/191; 427/407.1; 428/424.2

[58] Field of Search ......................... 427/407.1; 525/194, 525/162, 191; 428/424.2

[56] References Cited

U.S. PATENT DOCUMENTS

| | | | |
|---|---|---|---|
| 4,539,363 | 9/1985 | Backhouse | 524/460 |
| 4,565,730 | 1/1986 | Pota et al. | 428/204 |

FOREIGN PATENT DOCUMENTS

| | | | |
|---|---|---|---|
| 0287144 | 3/1988 | European Pat. Off. | C09D 3/80 |
| 0332011 | 2/1989 | European Pat. Off. | C08F 220/14 |

*Primary Examiner*—James J. Seidleck
*Assistant Examiner*—Duc Truong

[57] ABSTRACT

A process for the preparation of multicoat coatings in which a pigmented aqueous basecoat composition is used which comprises a water-thinnable emulsion polymer as the film-former. The water-thinnable emulsion polymer is prepared in a two-stage emulsion polymerization. The first stage gives rise to a polymer having a glass transition temperature ($T_{G1}$) of +30° to +110° C. In the second stage a mixture of monomers is polymerized in the presence of the polymer prepared in the first stage which by an exclusive polymerization gives rise to a polymer having a glass transition temperature ($T_{G2}$) of −60° to +20° C. The hydroxyl value of the emulsion polymer is between 2 and 100.

17 Claims, No Drawings

PREPARATION OF A MULTICOAT COATING, WATER-THINNABLE COATING COMPOSITIONS, WATER-THINNABLE EMULSION POLYMERS AND PREPARATION OF WATER-THINNABLE EMULSION POLYMERS

This is a continuation of application Ser. No. 07/679,071, filed as PCT/EP89/01434, Nov. 27, 1989, now abandoned.

The invention relates to a process for the preparation of a multicoat protective and/or decorative coating on a substrate surface, in which process (1) a pigmented aqueous coating composition which comprises as the film-former a water-thinnable emulsion polymer, is applied to the substrate surface as basecoat composition (2) a polymeric film is formed from the composition applied in stage (1)

(3) a suitable clear topcoat composition is applied to the basecoat obtained in this manner and subsequently (4) the basecoat and the topcoat are baked together.

The invention also relates to water-thinnable coating compositions, to water-thinnable emulsion polymer and to a process for the preparation of water-thinnable emulsion polymers.

The process, described above, for the preparation of multicoat protective and/or decorative coatings is known and is particularly employed for producing metallic finishes on automotive bodies (cf., for example, EP-A-89,497, DE-A-3,628,124 and EP-A-38,127).

Only then is it possible to produce metallic finishes having a satisfactory metallic effect by the process under discussion, if the aqueous basecoat compositions used are so constituted that they can be applied to the substrate in relatively thin, rapidly drying films—especially when applied with the aid of automatic painting equipment—and if, subsequent to the execution of the process stages (3) and (4) the metallic pigment particles are aligned in parallel with the substrate surface.

Furthermore, the aqueous basecoat compositions must be so constituted that the basecoat of the baked metallic finish adheres well to the substrate and the clear topcoat adheres well to the basecoat. In addition, the aqueous basecoat compositions must be so constituted that the baked metallic finish shows no loss of gloss, loss of adhesion or even blistering after exposure to the condensed water steady conditions test.

It is finally desirable that the aqueous basecoat compositions possess a long shelf-life.

DE-A 3,628,124 discloses aqueous basecoat compositions which comprise a mixture of a water-thinnable emulsion polymer and a water-thinnable polyurethane resin as the film-former. These basecoat compositions fail to meet the above requirements in the optimum way possible.

The object forming the basis of the present invention is to prepare aqueous basecoat compositions which are suitable for the process under discussion and meet the above requirements in the optimum way possible.

Surprisingly, this object is achieved via aqueous basecoat compositions which comprise a water-thinnable emulsion polymer, which polymer can be obtained (a) by polymerizing in a first stage 10 to 90 parts by weight of an ethylenically unsaturated monomer or a mixture of ethylenically unsaturated monomers in aqueous phase in the presence of one or more emulsifiers and one or more radical-forming initiators, the ethylenically unsaturated monomer or the mixture of ethylenically unsaturated monomers being chosen such that the first stage gives rise to a polymer having a glass transition temperature ($T_{G1}$) of +30° to +110° C., and (b) by polymerizing in a second stage 90 to 10 parts by weight of an ethylenically unsaturated monomer or a mixture of ethylenically unsaturated monomers, after at least 80% by weight of the ethylenically unsaturated monomer or the mixture of ethylenically unsaturated monomers used in the first stage has reacted, in the presence of the polymer obtained in the first stage, the monomer used in the second stage or the mixture of ethylenically unsaturated monomers used in the second stage being chosen such that an exclusive polymerization of the monomer used in the second stage or of the mixture of ethylenically unsaturated polymers used in the second stage gives rise to a polymer having a glass transition temperature ($T_{G2}$) of −60° to +20° C., the reaction conditions being chosen such that the resultant emulsion polymer has a number average molecular mass of 200,000 to 2,000,000, and the nature and amount of the ethylenically unsaturated monomer or the mixture of monomers used in the first stage and the nature and amount of the ethylenically unsaturated monomer or the mixture of monomers used in the second stage are chosen such that the resultant emulsion polymer has a hydroxyl value of 2 to 100 and the difference $TG_1-TG_2$ is 10° to 170° C.

The water-thinnable emulsion polymers used according to the invention can be prepared by a two-stage emulsion polymerization in an aqueous medium using known equipment, for example a stirred reaction vessel provided with means of heating and cooling. The addition of the monomers can be effected by first placing a solution comprising the total water, the emulsifier and some of the initiator in the reaction vessel and then slowly adding, at the polymerization temperature, the monomer or the mixture of monomers and, separately but side by side, the remaining initiator. However, it is also possible first to introduce some of the water and emulsifier and to form from the remaining water and emulsifier and from the monomer or the mixture of monomers a pre-emulsion which is then slowly added at the polymerization temperature, the initiator being again added separately.

It is preferred in the first stage to add the monomer or the mixture of monomers in the form of a pre-emulsion, and in the second stage to add the monomer or the mixture of monomers as such, ie. without water or emulsifier, and to add the initiator separately but side by side. It is particularly preferred in the first stage to prepare first a seed polymer from some of the pre-emulsion used in the first stage (usually about 30% by weight of the total pre-emulsion to be used), and then to add the remaining pre-emulsion to be used in the first stage.

The polymerization temperature is generally in the range from 20° to 100° C., preferably 40° to 90° C.

The ratio of the monomer to the water can be chosen such that the resultant dispersion has a solids content of 30 to 60% by weight, preferably 35 to 50% by weight.

The emulsifier used is preferably an anionic emulsifier as such or in admixture.

Examples of suitable anionic emulsifiers are the alkali metal salts of hemi-esters of sulfuric acid of alkylphenols or alcohols, also the hemi-esters of sulfuric acid of oxyethylated alkylphenols or oxyethylated alcohols, preferably the alkali metal salts of the hemi-ester of sulfuric acid of a nonylphenol which has reacted with 4–5 mol of ethylene oxide per mol of the phenol, alkyl or aryl sulfonates, sodium lauryl sulfate, sodium lauryl ethoxylate sulfate and secondary sodium alkanesulfonates whose carbon chain contains 8–20 carbon atoms. The amount of the anionic emulsifier is 0.1–5.0% by weight, based on the monomers, preferably 0.5–3.0% by weight. Furthermore, in order to increase the stability of the aqueous dispersions, a non-ionic emulsifier of the type of an ethoxylated alkylphenol or fatty alcohol, eg. an adduct of 1 mol of nonylphenol and 4–30 mol of ethylene oxide, may be additionally used in admixture with the anionic emulsifier.

A peroxide compound is preferably used as the radical-forming initiator. The initiator is soluble in water or the monomer. A water-soluble initiator is preferably used.

Suitable initiators are the usual inorganic percompounds, such as ammonium persulfate, potassium persulfate, ammonium or alkali metal peroxydiphosphate, and organic peroxides, eg. benzoyl peroxide, organic peresters, such as perisopivalate, in some cases in combination with reducing agents such as sodium disulfite, hydrazine, hydroxylamine and catalytic amounts of accelerators, such as iron, cobalt, cerium and vanadyl salts, preferably alkali metal or ammonium peroxydisulfates. Redox initiator systems which are disclosed in EP-A-107,300, may be likewise used.

In the first stage, 10 to 90, preferably 35 to 65, parts by weight of an ethylenically unsaturated monomer or a mixture of ethylenically unsaturated monomers is emulsion polymerized. The monomer or mixture of monomers used in the first stage is chosen such that a polymer having a glass transition temperature ($T_{G1}$) of +30° C. to +110° C., preferably 60° to 95° C., is obtained when the monomer or the mixture of monomers used in the first stage has fully polymerized. Since the glass transition temperature of emulsion polymers can be calculated approximately from the equation $$\frac{1}{T_G} = \sum_{n=1}^{n=x} \frac{W_n}{T_{Gn}};$$

$T_G$ = glass transition temperature of the copolymer in °K.

$W_n$ = weight of the $n$th monomer $T_{Gn}$ = glass transition temperature of the homopolymer obtained from the $n$th monomer $x$ = number of different monomers, a person skilled in the art has no difficulties in selecting the monomer or the mixture of monomers to be used in the first stage such that a polymer having a glass transition temperature ($T_{G1}$) of +30° to +110° C., preferably 60° to 950° C., is obtained, when the monomer or the mixture of monomers used in the first stage has fully polymerized.

Examples of monomers which may be used in the first stage, are: vinylaromatic hydrocarbons such as styrene, α-alkylstyrene and vinyltoluene, esters of acrylic acid or methacrylic acid, in particular aliphatic and cycloaliphatic acrylates or methacrylates having up to 20 carbon atoms in the alcohol radical, eg. methyl, ethyl, propyl, butyl, hexyl, ethylhexyl, stearyl, lauryl and cyclohexyl acrylates or methacrylates, acrylic and/or methacrylic acid, acrylamide and/or methacrylamide, N-methylolacrylamide and/or N-methylolmethacrylamide, hydroxyalkyl esters of acrylic acid, methacrylic acid or another α,β-ethylenically unsaturated carboxylic acid, eg. 2-hydroxyethyl acrylate, 2-hydroxypropyl acrylate, 3-hydroxypropyl acrylate, 2-hydroxypropyl methacrylate, 3-hydroxypropyl methacrylate, 2-hydroxyethyl methacrylate, 4-hydroxybutyl acrylate, 4-hydroxybutyl methacrylate etc.

The ethylenically unsaturated monomers or the mixtures of ethylenically unsaturated monomers used in the first stage are preferably those which are essentially free from hydroxyl and carboxyl groups. The term "essentially free" signifies that it is preferred to use monomers or mixtures of monomers which are free from hydroxyl and carboxyl groups, but it also signifies that the monomers or the mixtures of monomers used may also contain small amounts (eg. due to impurities) of hydroxyl and/or carboxyl groups. The hydroxyl and carboxyl groups content should preferably be not greater than would cause a polymer prepared from the monomer or the mixture of monomers used in the first stage to have a hydroxyl value of not more than 5 and an acid value of not more than 3.

It is particularly preferred that a mixture is used in the first stage which consists of (a1) 100 to 60, preferably 99.5 to 75, % by weight of a cycloaliphatic or aliphatic ester of methacrylic acid or acrylic acid or a mixture of such esters, and (a2) 0 to 40, preferably 0.5 to 25, % by weight of a monomer which is copolymerizable with (a1) or a mixture of such monomers, the total of the weight percentages of (a1) and (a2) being always 100% by weight.

Examples of the component (a1) which can be used, are: cyclohexyl acrylate, cyclohexyl methacrylate, alkyl acrylates and alkyl methacrylates having up to 20 carbon atoms in the alkyl radical, for example methyl, ethyl, propyl, butyl, hexyl, ethylhexyl, stearyl and lauryl acrylates and methacrylates or mixtures of these monomers.

Examples of the component (a2) which can be used, are vinylaromatic hydrocarbons such as styrene, α-alkylstyrene and vinyltoluene, acrylamide, methacrylamide, acrylonitrile and methacrylonitrile, or mixtures of these monomers.

After at least 80% by weight, preferably at least 95% by weight, of the ethylenically unsaturated monomer or the mixture of monomers used in the first stage have reacted, 90 to 10, preferably 65 to 35, parts by weight of an ethylenically unsaturated monomer or a mixture of ethylenically unsaturated monomers is emulsion polymerized in a second stage in the presence of the polymer obtained in the first stage, the monomer or the mixture of monomers used in the second stage being chosen such that an exclusive polymerization of the monomer or of the mixture of monomers used in the second stage gives rise to polymer having a glass transition temperature ($T_{G2}$) of −60° to +20° C., preferably −50° to 0° C. This choice poses no difficulties to a person skilled in the art, since the approximate glass transition temperatures of emulsion polymers can be readily approximately calculated—as already stated above.

It is further an essential part of the invention that the nature and amount of the monomer or the mixture of monomers used in the first stage and of the monomer or the mixture of monomers used in the second stage are chosen such that the resultant emulsion polymer has a hydroxyl value of 2 to 100, preferably 10 to 50, and the difference $T_{G1}$−$T_{G2}$ is 10 to 170, preferably 80° to 150° C.

Examples of monomers which can be used in the second stage, are: vinylaromatic hydrocarbons such as styrene, α-alkylstyrene and vinyltoluene, esters of acrylic acid or methacrylic acid, in particular aliphatic and cycloaliphatic acrylates or methacrylates having up to 20 carbon atoms in the alcohol radical, eg. methyl, ethyl, propyl, butyl, hexyl, ethylhexyl, stearyl, lauryl and cyclohexyl acrylates or methacrylates, acrylic and/or methacrylic acid, acrylamide and/or methacrylamide, N-methylolacrylamide and/or N-methylolmethacrylamide, hydroxyalkyl esters of acrylic acid, methacrylic acid or another α,β-ethylenically unsaturated carboxylic acid, eg. 2-hydroxyethyl acrylate, 2-hydroxypropyl acrylate, 3-hydroxypropyl acrylate, 2-hydroxypropyl methacrylate, 3-hydroxypropyl methacrylate, 2-hydroxyethyl methacrylate, 4-hydroxybutyl acrylate, 4-hdroxybutyl methacrylate etc.

It is preferred that a mixture is used in the second stage which consists of (b1) 47 to 99, preferably 75 to 90, % by weight of a cycloaliphatic or aliphatic ester of methacrylic acid or acrylic acid or a mixture of such esters (b2) 1 to 20, preferably 5 to 15, % by weight of a monomer which carries at least one hydroxyl group and is copolymerizable with (b1), (b3) and (b4), or a mixture of such monomers (b3) 0 to 8, preferably 2 to 6, % by weight of a monomer which carries at least one carboxyl or sulfonic acid group and is copolymerizable with (b1), (b2) and (b4), or a mixture of such monomers, and (b4) 0 to 25, preferably 2 to 15, % by weight of a further monomer which is copolymerizable with (b1), (b2) and (b3), or a mixture of such monomers, the total of the weight percentages of (b1), (b2), (b3) and (b4) being always 100% by weight.

Examples of the component (b1) which may be used are: cyclohexyl acrylate, cyclohexyl methacrylate, alkyl acrylate and alkyl methacrylate with up to 20 carbon atoms in the alkyl radical, eg. methyl, ethyl, propyl, butyl, hexyl, ethylhexyl, stearyl and lauryl acrylates and methacrylates or mixtures of these monomers.

Examples of the component (b2) which can be used are: hydroxyalkyl esters of acrylic acid, methacrylic acid or another α,β-ethylenically unsaturated carboxylic acid. These esters may be derived from an alkylene glycol which is esterified with the acid, or they can be obtained by reacting the acid with an alkylene oxide. Hydroxyalkyl esters of acrylic acid and methacrylic acid in which the hydroxyalkyl group comprises up to 4 carbon atoms, or mixtures of these hydroxyalkyl esters, are preferably used as the component (2). Examples of such hydroxyalkyl esters are 2-hydroxyethyl acrylate, 2-hydroxypropyl acrylate, 3-hydroxypropyl acrylate, 2-hydroxypropyl methacrylate, 3-hydroxypropyl methacrylate, 2-hydroxyethyl methacrylate, 4-hydroxybutyl acrylate or 4-hydroxybutyl methacrylate. Corresponding esters of other unsaturated acids, eg. ethacrylic acid, crotonic acid and similar acids having up to about 6 carbon atoms per molecule, may be also used.

Acrylic acid and/or methacrylic acid and/or acrylamidomethylpropanesulfonic acid are preferably used as the component (b3). However, other ethylenically unsaturated acids having up to 6 carbon atoms in the molecule may be also used. Examples of such acids are ethacrylic acid, crotonic acid, maleic acid, fumaric acid and itaconic acid.

Examples of the component (b4) which can be used are: vinylaromatic hydrocarbons such as styrene, α-alkylstyrene and vinyltoluene, acrylamide, methacrylamide, acrylonitrile and methacrylonitrile, or mixtures of these monomers.

The emulsion polymer used according to the invention should have a number average molecular mass (determined by gel permeation chromatography using polystyrene as standard) of 200,000 to 2,000,000, preferably from 300,000 to 1,500,000.

The person skilled in the art is aware how to choose the reaction conditions during the emulsion polymerization in order to obtain emulsion polymers having the number average molecular masses indicated above (cf. eg. Chemie, Physik und Technologie der Kunststoffe in Einzeldarstellungen, Dispersionen synthetischer Hochpolymerer [Chemistry, Physics and Technology of Plastics in Individual Preparations, Dispersions of Synthetic High Polymers], Part 1, by F. Hölscher, Springer Verlag, Berlin, Heidelberg, N.Y., 1969).

It is preferred that the aqueous basecoat compositions according to the invention comprise, in addition to the emulsion polymer described above, also a water-thinnable polyurethane resin as film-former.

The basecoat compositions according to the invention preferably comprise water-thinnable polyurethane resins containing urea groups which have a number average molecular weight (determined by gel permeation chromatography using polystyrene as standard) of 1,000 to 60,000, preferably 1,500 to 50,000, and an acid value of 5 to 70, preferably 10 to 30, and which can be prepared by reacting, preferably by chain lengthening, prepolymers comprising isocyanate groups with polyamines and/or hydrazine.

The preparation of the prepolymer containing isocyanate groups can be carried out by reacting polyalcohols having a hydroxyl value of 10 to 1,800, preferably 50 to 500, with excess polyisocyanates at temperatures up to 150° C., preferably 50° to 130° C., in organic solvents which are inert to isocyanates. The equivalence ratio of NCO to OH groups is between 1.5 and 1.0 to 1.0, preferably between 1.4 and 1.2 to 1. The polyols used for the preparation of the prepolymer may be low-molecular and/or high-molecular and they may contain non-reactive anionic groups.

In order to raise the hardness of the polyurethane, it is possible to use low-molecular polyols. They have a molecular weight of 60 to about 400 and may comprise aliphatic, alicyclic or aromatic groups. Amounts of up to 30% by weight, preferably about 2 to 20% by weight, of the total polyol components, are used. The low-molecular polyols have preferably up to about 20 carbon atoms per molecule, such as ethylene glycol, diethylene glycol, triethylene glycol, 1,2-propanediol, 1,3-propanediol, 1,4-butanediol, 1,2-butylene glycol, 1,6-hexanediol, trimethylolpropane, castor oil or hydrogenated castor oil, di(trimethylolpropane) ether, pentaerythritol, 1,2-cyclohexanediol, 1,4-cyclohexane- dimethanol, bisphenol A, bisphenol F, neopentyl glycol, neopentyl glycol hydroxypivalate, hydroxyethylated or hydroxypropylated bisphenol A, hydrogenated bisphenol A or mixtures thereof.

In order to obtain a highly flexible NCO prepolymer, a high proportion of a mainly linear polyol having a preferred hydroxyl value of 30 to 150, should be added. Up to 97% by weight of the total polyol can consist of saturated and unsaturated polyesters and/or polyethers having a molecular mass $\overline{Mn}$ of 400 to 5,000. Suitable high-molecular polyols are aliphatic polyether diols of the general formula $H—(—O—(—CHR)_n—)_m—OH$, in which R is hydrogen or a low alkyl which is unsubstituted or substituted by various substituents, n being 2 to 6, preferably 3 to 4, and m being 2 to 100, preferably 5 to 50. Examples of these are linear or branched polyether diols, such as poly(oxyethylene) glycols, poly(oxypropylene) glycols and/or poly(oxybutylene) glycols. The chosen polyether diols should not introduce an excess of ether groups, since otherwise the polymers formed swell in water. The preferred polyether diols are poly (oxypropylene) glycols having a molecular mass Mn in the range of 400 to 3,000. Polyester diols are prepared by esterifying organic dicarboxylic acids or their anhydrides with organic diols, or they may be derived from a hydroxy-carboxylic acid or a lactone. To prepare branched polyester polyols, polyols or polycarboxylic acids having a higher valency may be used to a small extent. The dicarboxylic acids and diols may be linear or branched aliphatic, cycloaliphatic or aromatic dicarboxylic acids or diols.

The diols used for the preparation of the polyesters consist eg. of alkylene glycols such as ethylene glycol, propylene glycol, butylene glycol, 1,4-butanediol, 1,6-hexanediol, neopentyl glycol and other diols such as dimethylcyclohexane. The acid component of the polyester consists mainly of low-molecular dicarboxylic acids or their anhydrides having 2 to 30, preferably 4 to 18 carbon atoms in the molecule. Examples of suitable acids are o-phthalic acid, isophthalic acid, terephthalic acid, tetrahydrophthalic acid, cyclohexanedicarboxylic acid, succinic acid, adipic acid, azelaic acid, sebacic acid, maleic acid, fumaric acid, glutaric acid, hexachloroheptanedicarboxylic acid, tetrachlorophthalic acid and/or dimerized fatty acids. Instead of these acids it is also possible to use their anhydrides, as long as they exist. In the formation of the polyester polyols smaller amounts of carboxylic acids having 3 or more carboxyl groups, for example trimellitic anhydride or the adduct of maleic anhydride and unsaturated fatty acids, may be also present.

Those polyester diols are also used according to the invention which are obtained by reacting a lactone with a diol. They are marked by the presence of a ter- minal hydroxyl group and recurring polyester moiety of the formula $—(—CO—(CHR)_n—CH_2—O—)—$, where n is preferably 4 to 6 and the substituent R hydrogen, alkyl, cycloalkyl or alkoxy. No substituent has more than 12 carbon atoms. The total number of carbon atoms in the substituent does not exceed 12 per lactone ring. Corresponding examples are hydroxycaproic acid, hydroxybutyric acid, hydroxydecanoic acid and/or hydroxystearic acid. The lactone used as starting material can be represented by the following general formula

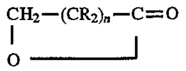

in which n and R have the meaning defined above. The unsubstituted -caprolactone in which n is 4 and all R substituents are hydrogen, is preferred for the preparation of the polyester diols. The reaction with lactone is initiated by low-molecular polyols, such as ethylene glycol, 1,3-propanediol, 1,4-butanediol and dimethylolcyclohexane. However, other reactants, such as ethylenediamine, alkyldialkanolamines or even urea, may be also reacted with caprolactone Suitable higher-molecular diols are also polylactam diols, which are prepared by reacting for example ϵ-caprolactam with low-molecular diols.

Aliphatic, cycloaliphatic and/or aromatic polyisocyanates having at least two isocyanate groups per molecule, are used as typical multifunctional isocyanates. The isomers or isomeric mixtures of organic diisocyanates are preferred. Suitable aromatic diisocyanates are phenylene diisocyanate, toluylene diisocyanate, xylylene diisocyanate, biphenylene diisocyanate, naphthylene diisocyanate and diphenylmethane diisocyanate.

Because of their good resistance to ultraviolet, (cyclo) aliphatic diisocyanates give rise to products having little tendency to yellowing. Corresponding examples are isophorone diisocyanate, cyclopentylene diisocyanate and the hydrogenation products of aromatic diisocyanates, such as cyclohexylene diisocyanate, methylcyclohexylene diisocyanate and dicyclohexylmethane diisocyanate. Examples of aliphatic diisocyanates are trimethylene diisocyanate, tetramethylene diisocyanate, pentamethylene diisocyanate, hexamethylene diisocyanate, propylene diisocyanate, ethylethylene diisocyanate, dimethylethylene diisocyanate, methyltrimethylene diisocyanate and trimethylhexane diisocyanate. Isophorone diisocyanate and dicyclohexylmethane diisocyanate are particularly preferred as diisocyanates. The polyisocyanate component used for the formation of the prepolymer can also contain a proportion of higher-valent polyisocyanates, provided no yellowing is caused thereby. Products which are formed by trimerization or oligomerization of diisocyanates or by reacting diisocyanates with polyfunctional compounds containing OH or NH groups, have been found satisfactory as triisocyanates. Examples of such products are the biuret of hexamethylene diisocyanate and water, the isocyanurate of hexamethylene diisocyanate or the adduct of isophorone diisocyanate with trimethylolpropane.

If desired, the average functionality can be reduced by adding monoisocyanates. Examples of such chain-terminating monoisocyanates are phenyl isocyanate, cyclohexyl isocyanate and stearyl isocyanate.

Polyurethanes are in general not compatible with water, if in their synthesis special components are not incorporated and/or if special preparative steps are not undertaken. Thus, the acid value which has been incorporated is such that the neutralized product is dispersible in water to give a stable dispersion. Such compounds are those which comprise two H-active groups which are reactive toward isocyanate groups and at least one group capable of forming anions. Suitable groups which react with isocyanate groups are in particular hydroxyl groups as well as primary and/or secondary amino groups. Groups which are capable of forming anions are carboxyl, sulfonic acid and/or phosphonic acid groups. Carboxylic acid or carboxylate groups are preferably used. They should be so slow to react that the isocyanate groups of the diisocyanate preferably react with the other groups of the molecule which are reactive toward isocyanate groups. Alkanoic acids having two substituents in the –position carbon atom are used for this purpose. The substituent may be a hydroxyl group, an alkyl group or an alkylol group. These polyols have at least one, in 5 general 1 to 3, carboxyl groups in the molecule. They have two to about 25, preferably 3 to 10 carbon atoms. Examples of such compounds are dihydroxypropionic acid, dihydroxysuccinic acid and dihydroxybenzoic acid. A particularly preferred group of dihydroxyalkanoic acids are the α,α-dimethylolalkanoic acids which possess the structural formula $RC(CH_2OH)_2COOH$ where R is hydrogen or an alkyl group having up to about 20 carbon atoms. Examples of such compounds are 2,2-dimethylolacetic acid, 2,2-dimethylolpropionic acid, 2,2-dimethylolbutyric acid and 2,2-dimethylolpentanoic acid. The preferred dihydroxyalkanoic acid is 2,2-dimethylolpropionic acid. Examples of amino-containing compounds are, -diaminovaleric acid, 3,4-diaminobenzoic acid, 2, 4-diaminotoluenesulfonic acid and 2,4-diaminodiphenylethersulfonic acid. The carboxyl-containing polyol can form 3 to 100% by weight, preferably 5 to 50% by weight, of the total polyol component in the NC0 prepolymers.

The amount of ionizable carboxyl groups available in salt form by the neutralization of the carboxyl groups is generally at least 0.4% by weight, preferably at least 0.7% by weight, based on the solids content. The upper limit is about 6% by weight. The amount of dihydroxyalkanoic acids in the non-neutralized prepolymers produces an acid value of at least 5, preferably at least 10. The upper limit of the acid value is in the neighborhood of 70, preferably in the neighborhood of 40, based on the solids content.

Prior to reacting with isocyanates, these dihydroxyalkanoic acids are advantageously neutralized at least in part with a tertiary amine in order to prevent a reaction with the isocyanates.

The NCO prepolymers used according to the invention may be prepared by simultaneously reacting the polyol or polyol mixture with an excess of diisocyanate. Otherwise the reaction may be also carried out in the prescribed sequence in stages.

Examples are disclosed in DE 2,624,442 and DE 3,210, 051. The reaction temperature may be as high as 150° C., a temperature in the range of 50° to 130° C. being preferred. The reaction is continued until practically all hydroxyl functions have reacted.

The NCO prepolymer contains at least about 0.5% by weight of isocyanate groups, preferably at least 1%by weight of NCO, based on the solids content. The upper limit is in the neighborhood of about 15% by weight, preferably 10% by weight, particularly preferably 5% by weight. The reaction may be carried out in the presence or absence of a catalyst, such as organotin compounds and/or tertiary amines. In order to maintain the coreactants in a fluid state and to make possible a better temperature control during the reaction, organic solvents which contain no Zerewitinoff-active hydrogen, may be added. Examples of suitable solvents are dimethylformamide, esters, ethers such as diethylene glycol dimethyl ether, ketoesters, ketones such as methyl ethyl ketone and acetone, ketones having substituted methoxy groups such as methoxyhexanone, glycol ether ester, chlorinated hydrocarbons, aliphatic and alicyclic hydrocarbon-pyrrolidones, such as N-methylpyrrolidone, hydrogenated furans, aromatic hydrocarbons and mixtures thereof. The amount of solvent can vary within wide limits and should be sufficient to form a prepolymer solution of suitable viscosity. 0.01 to 15% by weight of solvent, preferably 0.02 to 8% by weight of solvent, based on the solids content, is sufficient in most cases. If the boiling point of any water-insoluble solvents which may be present, is lower than that of water, these solvents may be carefully distilled off by vacuum distillation or thin-layer evaporation after preparation of the urea-containing polyurethane dispersion. Higher-boiling solvents should be water-soluble and remain in the aqueous polyurethane dispersion in order to facilitate the coalescing of the polymer particles during film formation. N-Methylpyrrolidone, as such or in admixture with ketones such as methyl ethyl ketone, is a particularly preferred solvent.

The anionic groups of the NCO prepolymer are at least partly neutralized by a tertiary amine. The increase in dispersibility in water achieved by this step provides for an infinite thinnability. It is also sufficient to disperse the neutralized urea-containing polyurethane to form a stable dispersion. Examples of suitable tertiary amines are trimethylamine, triethylamine, dimethylethylamine, diethylmethylamine, N-methylmorpholine. The NCO prepolymer is thinned after being neutralized with water and forms then a finely divided dispersion. Soon afterwards the isocyanate groups still present are reacted with diamines and/or polyamines containing primary and/or secondary amino groups as chain extenders. This reaction leads to a further linkage and to an increase of the molecular weight. The competing reaction between amine and water with the isocyanate must be well adjusted (duration, temperature, concentration) in order to obtain optimum properties and must be carefully supervised to achieve reproducible production conditions. Water-soluble compounds are preferred as chain extenders, since they increase the dispersibility of the polymeric end product in water. Hydrazine and organic diamines are preferred, since they usually produce the highest molecular mass without causing the resin to gel. However, it is assumed for this purpose that the ratio of the amino groups to the isocyanate groups is expediently chosen. The amount of the chain extender will depend on its functionality, the NCO content of the prepolymer and on reaction time. The ratio of the active hydrogen atoms in the chain extender to the NCO groups in the prepolymer should usually be less than 2:1 and preferably in the range of 1.0:1 to 1.75:1. The presence of excess active hydrogen, especially in the form of primary amino groups, may give rise to polymers having undesirably low molecular mass.

The polyamines are essentially alkylene polyamines having 1 to 40 carbon atoms, preferably about 2 to 15 carbon atoms. They can carry substituents which are free from any hydrogen atoms which are capable of reacting with isocyanate groups. Examples are polyamines with a linear or branched aliphatic, cycloaliphatic or aromatic structure and at least two primary amino groups. Suitable diamines are ethylenediamine, propylenediamine, 1,4-butylenediamine, piperazine, 1,4-cyclohexyldimethylamine, 1,6-hexamethylenediamine, trimethylhexamethylenediamine, methanediamine, isophoronediamine, 4, 4'-diaminodicyclohexylmethane and aminoethylethanolamine. Preferreddiamines are alkyldiamines or cycloalkyldiamines such as propylenediamine and 1-amino-3-aminomethyl-3,5,5-trimethylcyclohexane.

The chain lengthening can be carried out at least in part using a polyamine which contains at least three amino groups having a reactive hydrogen. The amount of this type of polyamine which can be used is such that unreacted amine nitrogen atoms with 1 or 2 reactive hydrogen atoms are present after the lengthening of the polymer. Polyamines which can be used for this purpose are diethylenetriamine, triethylenetetramine, dipropylenetriamine and dibutylenetriamine. Preferred polyamines are the alkyltriamines or cycloalkyltriamines such as diethylenetriamine. In order to prevent gel formation during the chain lengthening, small amounts of monoamines, such as ethylhexylamine, may be also added.

The water-thinnable polyurethane resins to be used according to the invention and their preparation are also disclosed in EP-A 89,497 and U.S. Pat. No. 4,719,132.

The mixture of emulsion polymer and polyurethane resin, contained in the preferred aqueous basecoat compositions as film-former, consists of 95 to 40% by weight of emulsion polymer and 5 to 60% by weight of polyurethane resin, the weight percentages being in each case based on the solids content and their total being always 100% by weight.

In addition to the emulsion polymer or the mixture of emulsion polymer and polyurethane resin, the aqueous basecoat compositions according to the invention contain advantageously further compatible water-thinnable synthetic resins, eg. aminoplast resins, polyesters and polyethers which generally serve as grinding resins for the pigments.

The aqueous basecoat compositions according to the invention preferably contain 5 to 20, particularly preferably 10 to 16, % by weight, based on the total solids content of the basecoat compositions, of a water-thinnable aminoplast resin, preferably melamine resin, and 5 to 20, preferably 8 to 15, % by weight of a water-thinable polyether (eg. polypropylene glycol having a number average molecular weight of 400 to 900).

The basecoat compositions according to the invention may comprise as pigments inorganic coloring pigments, eg.

titanium dioxide, iron oxide, carbon black etc., organic coloring pigments as well as the usual metal pigments (eg. commercial aluminum bronzes, alloy steel bronzes . . . ) and non-metallic effect pigments (eg. nacreous luster pigments and interference pigments). The basecoat compositions according to the invention preferably comprise metal pigments and/or effect pigments. The degree of pigmentation falls within the usual ranges.

Furthermore, crosslinked polymeric microparticles, such as those disclosed in EP-A 38,127, and/or the usual rheological inorganic or organic additives may be added to the basecoat compositions according to the invention. Thus, for example, water-soluble cellulose ethers, such ashydroxyethylcellulose,methylcellulose or carboxymethylcellulose, and synthetic polymers having ionic and/or associatively acting groups, such as polyvinyl alcohol, poly(meth)acrylamide, poly(meth)acrylic acid, polyvinylpyrrolidone, styrene-maleic anhydride or ethylene-maleic anhydride copolymers and their derivatives, as well as hydrophobically modified ethoxylated urethanes or polyacrylates, may act as thickeners. Carboxyl-containing polyacrylate copolymers having an acid value of 60 to 780, preferably 200 to 500, are particularly preferred.

The basecoat compositions according to the invention have generally a solids content of about 15 to 50% by weight. The solids content varies with the end use of the coating compositions. In the case of metallic paints, for example, it is preferably 17 to 25% by weight. For solid-color paints the solids content is higher, for example 30 to 45% by weight.

The coating compositions according to the invention may additionally contain the usual organic solvents. Their amount is kept as low as possible, for example below 15% by weight.

The pH of the basecoat compositions according to the invention is generally adjusted to between 6.5 and 9.0. The adjustment can be carried out using the usual amines, eg. ammonia, triethylamine, dimethylaminoethanol and N-methylmorpholine.

The object outlined at the outset is achieved by the preparation of the basecoat compositions according to the invention.

The basecoat compositions according to the invention provide high-quality coatings even without being themselves coated with a clear topcoat composition.

The basecoat compositions according to the invention may be applied to any substrate, eg. metal, wood, plastics or paper.

The examples below explain the invention in greater detail.

A. PREPARATION OF THE EMULSION POLYMERS

Emulsion Polymer Dispersion 1

1344 g of deionized water and 12 g of a 30% aqueous solution of the ammonium salt of penta(ethylene glycol) nonylphenyl ether sulfate (Fenopon® EP 110 from GAF Corp., emulsifier 1) are introduced into a cylindrical cal glass vessel with double walls, provided with a stirrer, reflux condenser, stirrable feed vessel, dropping funnel and thermometer, and the mixture is heated to 82° C. An emulsion is prepared in the stirrable feed vessel from 720 g of deionized water, 24 g of emulsifier 1, 10.8 g of acrylamide, 864 g of methyl methacrylate and 216 g of n-butyl methacrylate. 30% by weight of this emulsion are added to the mixture in the glass vessel, followed by a dropwise addition, in the course of 5 minutes, of 28% by weight of a solution of 3.1 g of ammonium peroxodisulfate (APS) in 188 g of deionized water. An exothermic reaction sets in. The reaction temperature is kept between 82° and 88° C. 15 minutes after the addition of the ammonium peroxodisulfate solution has been completed, the remaining 70% by weight of the emulsion are added together with the remaining 72% by weight of the ammonium peroxodisulfate solution in the course of one hour, the temperature being kept at 85° C. The reaction mixture is then cooled to 82° C., and a mixture of 842 g of n-butyl acrylate, 108 g of hydroxypropyl methacrylate, 43 g of methyl methacrylate, 43.2 g of methacrylic acid, 32.4 g of acrylamide and 5.4 g of eicosa(ethylene glycol) nonylphenyl ether (Antarox® CO 850 from GAF Corp., emulsifier 2) as well as 343 g of deionized water are added in the course of 2 hours. When the addition has been completed, the reaction mixture is kept for a further 1.5 hours at 85° C. It is then cooled and the dispersion is passed through a fabric with a 30 μm mesh size. A finely divided dispersion is obtained which has a non-volatile content of 45% by weight, a pH of 3.4, an acid value of 13 and a hydroxyl value of 20.

Emulsion Polymer Dispersion 2

1344 g of deionized water and 12 g of a 40% aqueous solution of the ammonium salt of penta(ethylene glycol) nonylphenyl ether sulfate (Fenopon® EP 110 from GAF Corp., emulsifier 1) are introduced into a cylindrical glass vessel with double walls, provided with a stirrer, reflux condenser, stirrable feed vessel, dropping funnel and thermometer, and the mixture is heated to 80° C. An emulsion is prepared in the stirrable feed vessel fom 720 g of deionized water, 24 g of emulsifier 1, 10.8 g of acrylamide, 518 g of methyl methacrylate, 292 g of n-butyl methacrylate and 205 g of styrene.

30% by weight of this emulsion are added to the mixture in the glass vessel, followed by a dropwise addition, in the course of 5 minutes, of a solution of 0.9 g of ammonium peroxodisulfate APS in 55 g of deionized water. An exothermic reaction sets in. The reaction temperature is kept between 80° and 85° C. 15 minutes after the addition of the above APS solution has been completed, a solution of 2.2 g of APS in 480 g of water is added in the course of 3 hours and the remaining 70% by weight of the above emulsion are added in the course of one hour, the reaction temperature being kept at 80° C. After the addition of the emulsion has been completed, the reaction mixture is cooled to 77° C. and a mixture of 745 g of n-butyl acrylate, 119 g of methyl methacrylate, 108 g of hydroxypropyl methacrylate, 54 g of styrene, 42.7 g of ethylhexyl acrylate, 42.7 g of methacrylic acid, 21.6 g of acrylamide and 2.2 g of emulsifier 2 is added in the course of 2 hours. After the addition has been completed, the reaction mixture is kept for a further 1.5 hours at 80° C. It is then cooled and the dispersion is passed through a fabric with a 30 μm mesh size. A finely divided dispersion is obtained which has a non-volatile content of 45% by weight, a pH of 3.8, an acid value of 13 and a hydroxyl value of 19.

Emulsion Polymer Dispersion 3

1109 g of deionized water and 10 g of a 30% aqueous solution of the ammonium salt of penta(ethylene glycol) nonylphenyl ether sulfate (Fenopon® EP 110 from GAF Corp., emulsifier 1) are introduced into a cylindrical glass vessel with double walls, provided with a stirrer, reflux condenser, stirrable feed vessel, dropping funnel and thermometer, and the mixture is heated to 82° C. An emulsion is prepared in the stirrable feed vessel from 748.2 g of deionized water, 20.3 g of emulsifier 1, 9.0 g of acrylamide, 718.1 g of methyl methacrylate and 179.5 g of n-butyl methacrylate. 30% by weight of this emulsion are added to the mixture in the glass vessel, followed by a dropwise addition, in the course of 5 minutes, of 10% by weight of a solution of 7.2 g of ammonium peroxodisulfate in 305 g of deionized water. An exothermic reaction sets in. The reaction temperature is kept between 82° and 88° C. 15 minutes after the addition of the ammonium peroxodisulfate solution has been completed, the remaining 70% by weight of the emulsion are added together with the remaining 90% by weight of the ammonium peroxodisulfate solution in the course of one hour, the temperature being kept at 82° C. A mixture of 700 g of n-butyl acrylate, 89.8 g of hydroxypropyl methacrylate, 35.9 g of methyl methacrylate, 35.9 g of methacrylic acid, 26.9 g of arcylamide and 4.5 g of eicosa (ethylene glycol) nonylphenyl ether (Antarox® CO 850 from GAF Corp., emulsifier 2) is then added in the course of 2 hours. When the addition has been completed, the reaction mixture is kept for a further 1.5 hours at 82° C. It is then cooled and the dispersion is passed through a fabric with a 30 μm mesh size. A finely divided dispersion is obtained which has a non-volatile content of 45% by weight, a pH of 2.5, an acid value of 14 and a hydroxyl value of 20.

Emulsion Polymerization Dispersion 4

1344 g of deionized water and 12 g of a 30% aqueous solution of the ammonium salt of penta(ethylene glycol) nonylphenyl ether sulfate (Fenopon® EP 110 from GAF Corp., emulsifier 1) are introduced into a cylindrical glass vessel with double walls, provided with a stirrer, reflux condenser, stirrable feed vessel, dropping funnel and thermometer, and the mixture is heated to 82° C. An emulsion is prepared in the stirrable feed vessel from 477 g of deionized water, 66.7 g of emulsifier 1, 10.8 g of acrylamide, 864 g of methyl methacrylate and 216 g of n-butyl methacrylate. 30% by weight of this emulsion are added to the mixture in the glass vessel, followed by a dropwise addition, in the course of 5 minutes, of 3.6% by weight of a solution of 8.6 g of ammonium peroxodisulfate in 183 g of deionized water. An exothermic reaction sets in. The reaction temperature is kept between 82° and 88° C. 15 minutes after the addition. of the ammonium peroxodisulfate solution has been completed, the remaining 70% by weight of the emulsion together with the remaining 96.4% by weight of the ammonium peroxodisulfate solution are added in the course of one hour, the temperature being kept at 82° C. A mixture of 842 g of n-butyl acrylate, 108 g of hydroxypropyl methacrylate, 43.2 g of methyl methacrylate, 43.2 g of acrylamidomethylpropanesulfonic acid, 32.4 g of acrylamide, 66.7 g of emulsifier 1 and 5.4 g of eicosa (ethylene glycol) nonylphenyl ether (Antarox® CO 850 from GAF Corp., emulsifier 2) is then added in the course of 2 hours. When the addition has been completed, the reaction mixture is kept for a further 1.5 hours at 82° C. It is then cooled and the dispersion is passed through a fabric with a 30 μm mesh size. A finely divided dispersion is obtained which has a non-volatile content of 46% by weight, a pH of 2.5, an acid value of 6 and a hydroxyl value of 19.

Emulsion Polymer Dispersion 5

1344 g of deionized water and 12 g of a 30% aqueous solution of the ammonium salt of penta(ethylene glycol) nonylphenyl ether sulfate (Fenopon® EP 110 from GAF Corp., emulsifier 1) are introduced into a cylindrical glass vessel with double walls, provided with a stirrer, reflux condenser, stirrable feed vessel, dropping funnel and thermometer, and the mixture is heated to 82° C. An emulsion is prepared in the stirrable feed vessel from 720 g of deionized water, 24 g of emulsifier 1, 43.2 g of acrylamide, 907 g of methyl methacrylate, 216 g of n-butyl methacrylate, 842 g of n-butyl acrylate, 108 g of hydroxypropyl methacrylate, 43.2 g of methacrylic acid and 5.4 g of emulsifier 2.10% by weight of this emulsion are added to the mixture in the glass vessel, followed by a dropwise addition, in the course of 5 minutes, of a solution of 0.87 g of ammonium peroxodisulfate in 53 g of deionized water. An exothermic reaction sets in. The reaction temperature is kept between 82° and 88° C. 15 minutes after the addition of the APS solution has been completed, the remaining 90% by weight of the emulsion is added in the course of 3 hours and a solution of 2.23 g of APS in 478 g of deionized water is added in the course of 3.5 hours, the temperature being kept at 82° C.

After the addition has been completed, the reaction mixture is kept for a further 1.5 hours at 82° C. It is then cooled and the dispersion is passed through a fabric with a 30 μm mesh size. A finely divided dispersion is obtained which has a non-volatile content of 45% by weight, a pH of 5.8, an acid value of 13 and a hydroxyl value of 20.

B. PREPARATION OF THE POLYURETHANE RESINS USED ACCORDING TO THE INVENTION

Polyurethane Resin Dispersion 1

570 g of a commercial polyester prepared from caprolactone and ethylene glycol, having a hydroxyl value of 196, are stripped of water by being heated for 1 hour at 100° C. under reduced pressure. 524 g of 4, 4'-dicyclohexylmethane diisocyanate are added at 80° C. and the mixture is stirred at 90° C. until the isocyanate content is 7.52% by weight, based on the total weight. The reaction mixture is cooled to 60° C., a solution of 67 g of dimethylolpropionic acid and 50 g of triethylamine in 400 g of N-methylpyrrolidone is added and the mixture is stirred for 1 hour at 90° C. The resultant mass is poured into 1840 g of cold deionized water with vigorous stirring. To the resultant dispersion there are added, in the course of 20 minutes, 86 g of 15% hydrazine solution with vigorous stirring. The resultant finely divided dispersion has a solids content of 35% and an efflux time of 27 seconds in DIN cup No. 4.

Polyurethane Resin Dispersion 2

830 g of a polyester from neopentyl glycol, 1,6-hexanediol and adipic acid, having a hydroxyl value of 135 and an acid value of less than 3, are stripped of water by being heated for 1 hour at 100° C. under reduced pressure. 524 g of 4,4'-dicyclohexylmethane diisocyanate are added at 80° C. and the mixture is stirred at 90° C. until the free isocyanate groups content is 6.18% by weight, based on the total weight. The reaction mixture is cooled to 60° C., a solution of 67 g of dimethylpropionic acid and 50 g of triethylamine in 400 g of N-methylpyrrolidone is added and the mixture is stirred for 1 hour at 90° C.

The resultant mass is poured into 2400 g of cold deionized water with vigorous stirring. A finely divided dispersion is obtained. To this dispersion there are added, in the course of 20 minutes, 80 g of a 30% aqueous solution of ethylenediamine with vigorous stirring. The resultant very finely divided dispersion has a solids content of 35% and an efflux time of 23 seconds in the DIN cup No. 4.

C PREPARATION OF THE BASECOAT COMPOSITIONS 18.2 g of butyl glycol, 3.7 g of a commercial melamine-formaldehyde resin (Cymel® 301), 3.1 g of polypropylene glycol (average molecular weight ≈400) and 7.2 g of an aluminum bronze according to DE-OS 3,636,183 (aluminum content: 60% by weight) are stirred for 15 minutes using a high-speed stirrer at 300–500 rpm. Mixture 1 is obtained.

27.2 g of emulsion polymer dispersion 1, 2, 3 or 4 are mixed with 11.6 g of polyurethane resin dispersion 1 and 19.6 g of deionized water. The pH of the mixture is adjusted to 7.7 using a 5% aqueous dimethylethanolamine solution, and 9.4 g of a 3.5% solution of a commercial polyacrylic acid thickener (Viscalex®HV 30 from Allied Colloids, pH: 8.0) are added. Mixture 2 is obtained.

To prepare the basecoat paint according to the invention, mixtures 1 and 2 are mixed for 30 minutes at 800–1000 rpm and the pH of the mixture is then adjusted to 7.7 using a 5% aqueous dimethylethanolamine solution. The viscosity is then adjusted to an efflux time of 25 seconds in the DIN cup No. 4 by adding deionized water. The basecoat compositions BC1, BC2, BC3 and BC4 according to the invention are obtained.

The basecoat composition BC5 is obtained by incorporating 36.2 g of the emulsion polymer dispersion 1 into mixture 2. BC5 contains no polyurethane resin dispersion.

The basecoat compositions obtained in this manner possess excellent shelf life.

The basecoat compositions are sprayed by well-known methods onto phosphated steel panels (Bonder 132) which have been coated with a commercial electrocoating paint and a commercial filler; after a 10 minutes' flash-off period they are then coated with a commercial clear-coat and are baked for 20 minutes at 140° C.

The metallic finishes obtained in this manner have a good metallic effect, good adhesion to the filler, good intercoat adhesion between the basecoat and the topcoat, good gloss and good resistance to exposure to the condensed moisture steady conditions test according to DIN 50 017. BC1, BC2, BC3 and BC4 exhibit a better metallic effect than BC5.

Some of the coated panels are recoated with the basecoat compositions BC1, BC2, BC3, BC4 and BC5 and are then coated with a commercial clearcoat. The coatings obtained in this manner are baked for 40 minutes at 80° C. The coatings baked at 80° C. adhere very well to the coatings baked at 140° C.

Comparative Example

A basecoat composition prepared according to the above description using the emulsion polymer dispersion 5 possesses inadequate shelf life.

We claim:

1. A process for the preparation of a multicoat protective and/or decorative coating on a substrate surface, comprising the following steps:

(1) applying a pigmented aqueous coating composition which comprises as the film-former a water-thinnable emulsion polymer to the substrate surface as basecoat composition;

(2) forming a polymeric film from the composition applied in stage (1);

(3) applying a suitable clear topcoat composition to the basecoat obtained in this manner; and (4) baking the basecoat and the topcoat together, wherein the basecoat composition comprises a water-thinnable emulsion polymer obtained by a process comprising the following steps:

(a) polymerizing in a first stage 10 to 90 parts by weight of a mixture of ethylenically unsaturated monomers in aqueous phase in the presence of one or more emulsifiers and one or more radical-forming initiators, the mixture of ethylenically unsaturated monomers being chosen such that the first stage gives rise to a polymer having a glass transition temperature ($T_{G1}$) of +30° to +110° C., and wherein the monomers used in the first stage comprise (a1) 99.5 to 60% by weight of a cycloaliphetic or aliphatic ester of methacrylic said or acrylic acid or a mixture of such esters, and (a2) 0.5 to 40% by weight of a monomer which copolymerizable with (a1) or a mixture of such monomers the total of the weight percentages of (a1) and (a2) being always 100% by weight, and monomers (a1) and being free hydroxy and carboxyl functionality, and (b) polymerizing in a second stage 90 to 10 parts by weight of a mixture of ethylenically unsaturated monomers, after at least 80% by weight of the monomer or the mixture of monomers used in the first stage has reacted, in the presence of the polymer obtained in the first stage, the mixture of ethylenically unsaturated monomers used in the second stage being chosen such that an exclusive polymerization of the mixture of ethylenically unsaturated monomers used in the second stage gives rise to a polymer having a glass transition temperature ($T_{G2}$) of −60° to +20° C., wherein a mixture is used in the second stage which comprises (b1) 47to 99% by weight of a cycloaliphatic or aliphatic ester of methacrylic acid or acrylic acid or a mixture of such esters, (b2) 1 to 20% by weight of a monomer which carries at least one hydroxyl group and is copolymerizable which carries at (b1), (b3), and (b4), or a mixture of such monomers, (b3) up to 8% by weight of a monomer which carries at least one carboxyl or sulfonic acid group and is copolymerizable with (b1), (b2), and (b4), or a mixture of such monomers, and (b4) 0 to 25% by weight of a further monomer which is copolymerizable with (b1), (b2), and (b3) or a mixture of such monomers, the total of the weight percentages of (b1), (b2), (b3) and (b4) being always 100% by weight, the reaction conditions being chosen such that the resultant emulsion polymer has a number average molecular mass of 200,000 to 2,000,000, and the nature and amount of the mixture of monomers used in the first stage and the nature and amount of the the mixture of monomers used in the second stage are chosen such that the resultant emulsion polymer has a hydroxyl value of 2 to 100 and the difference $T_{G1}-T_{G2}$ is 10° to 170° C.

2. Water-thinnable coating compositions which comprise a water-thinnable emulsion polymer which is obtained by a process comprising the steps (a) polymerizing in a first stage 10 to 90 parts by weight of a mixture of ethylenically unsaturated monomers in aqueous phase in the presence of one or more emulsifiers and one or more radical-forming initiators, the mixture of ethylenically unsaturated monomers being chosen such that the first stage gives rise to a polymer having a glass transition temperature ($T_{G1}$) of +30° to +110° C., wherein the monomers used in the first stage comprise (a1) 99.5 to 60% by weight of a cycloaliphatic or aliphatic ester of methacrylic acid or acrylic acid or a mixture of such esters, and (a2) 0.5 to 40% by weight of a monomer which copolymerizable with (a1) or a mixture of such monomers, the total of the weight percentages of (a1) and (a2) being always 100% b weight, and (a1) and (a2) being free of hydroxy and carboxyl functionality, and (b) polymerizing in a second stage 90 to 10 parts by weight of a mixture of ethylenically unsaturated monomers, after at least 80% by weight of the ethylenically unsaturated monomer or the mixture of monomers used in the first stage has reacted in the presence of the polymer obtained in the first stage, the mixture of ethylenically unsaturated monomers used in the first stage and the nature and amount of the mixture of monomers used in the second stage being chosen such that an exclusive polymerization of the mixture of ethylenically unsaturated monomers used in the second stage gives rise to a polymer having a glass transition temperature ($T_{G2}$) of −60° to +20° C., wherein a mixture is used in the second stage which comprises (b1) 47 to 99% by weight of a cycloaliphtic or aliphatic ester of methacrylic acid or acrylic acid or a mixture of such esters, (b2) 1 to 20% by eight of a monomer which carries at least one hydroxyl group and is copoloymerizable with (b1), (b3), and (b4), or a mixture of such monomers, (b3) up to 8% by weight of a monomer which carries at least one carboxyl or sulfonic acid group and copolymerizable with (b1), (b2), and (b4), or a mixture of such monomers, and (4) 0 to 25% by weight of a further monomer which is copolymerizable with (b1), (b2), and (b3), or a mixture of such monomers, the total of the weight percentages of (b1), (b2), (b3), and (b4) being always 100% by weight, the reaction conditions being chosen such that the resultant emulsion polymer has a number average molecular mass of 200,000 to 2,000,000, and the nature and amount of the mixture of monomers used in the second stage are chosen such that the resultant emulsion polymer has a hydroxyl value of 2 to 100 and the difference $T_{G1}-T_{G2}$ is 10° to 170° C.

3. The process as claimed in claim 1, wherein the basecoat composition or compositions further comprises a metallic pigment.

4. The process as claimed in claim 1, wherein the film-former of step (1) comprises to 40% by weight of the emulsion polymer and 5 to 60% by weight of a water-thinnable polyurethane resin, the weight percentages in each case referring to the solids content and their sum being always 100% by weight.

5. Water-thinnable emulsion polymers which are obtained by the following steps:

(a) polymerizing in a first stage 10 to 90 parts by weight of a mixture of ethylenically unsaturated monomers in aqueous phase in the presence of one or more emulsifiers and one or more radical-forming initiators, the mixture of ethylenically unsaturated monomers being chosen such that the first stage give rise to a polymer having a glass transition temperature ($G_{T1}$) of +30° to +110° C.

where in the monomers used in the first stage comprise (a1) 99.5 to 60% by weight of a cycloaliphatic or aliphatic ester of methacrylic acid or acrylic acid or a mixture of such esters, and (a2) 0.5 to 40by weight of a monomer which is copolymerizable with (a1) or a mixture of such monomers, the total of the weight percentage of (a1) and ($a_2$) being always 100% by weight, and (a1) and (a2) being free of hydroxy and carboxyl functionality, and (b) polymerizing in a second stage 90 to 10 parts by weight of a mixture of ethylenically unsaturated monomers, after at least 80% by weight of the ethylenically unsaturated monomer or the mixture of monomers used in the first stage has reacted, in the presence of the polymer obtained in the first stage, the mixture of ethylenically unsaturated monomers used in the second stage being chosen such that an exclusive polymerization of the mixture of ethylenically unsaturated monomers used in the second stage gives rise to a polymer having a glass transition temperature ($T_{G2}$) of −60° to +20° C., wherein a mixture is used in the second stage which comprises (b1) 47 to 99% by weight of a cycloaliphatic or aliphatic ester of methacrylic acid or acrylic acid or a mixture of such esters, (b2) 1 to 20% by weight of a monomer which carries at least one hydroxyl group and is copolymerizable with (b1), (b3), and (b4), or a mixture of such monomers, (b3) up to 80 by weight of a monomer which carries at least one carboxyl or sulfonic acid group and is copolymerizable with (b1), (b2), and (b4), or a mixture of such monomers, and (b4) 0 to 25% by weight of a further monomer which is copolymerizable with (b1), (b2), and (b3), or a mixture of such monomers, the total of the weight percentages of (b1), (b2), (b3), and (b4) being always 100% by weight, the reaction conditions being chosen such that the resultant emulsion polymer has a number average molecular mass of 200,000 to 2,000,000, and the nature and amount of the mixture of monomers used in the first stage and the nature and amount of the mixture of the monomers used in the first stage and the amount of the mixture of the monomers used in the second stage are chosen such that the resultant emulsion polymer has a hydroxyl value of 2 to 100 and the difference $T_{G1}-T_{G2}$ is 10° to 170° C.

6. A process for the preparation of water-thinnable emulsion polymers which comprises the following steps:

(a) polymerizing in a first stage 10 to 90 parts by weight of a mixture of ethylenically unsaturated monomers in aqueous phase in the presence of one or more emulsifiers and one or more radical-forming initiators, the mixture of ethylenically unsaturated monomers being chosen such that the first stage gives rise to a polymer having a glass transition temperature ($T_{G1}$) of +30° to +110° C., wherein the monomers used in the first stage comprise (a1) 99.5 to 60% by weight of a cycloaliphatic or aliphatic ester of methacrylic acid or acrylic acid or a mixture of such esters, and (a2) 0.5 to 40% by weight of a monomer which copolymerizable with (a1) or mixture of such the total of the weight percentages of (a1) and (a2) being always 100 by weight and (a1) and (a2) being free of hydroxy and carboxy functionality, and (b) polymerizing in a second stage 90 to 10 parts by weight of a mixture of ethylenically unsaturated monomers, after at least 80% by weight of the ethylenically unsaturated monomer or the mixture of monomers used in the first stage has reacted, in the presence of the polymer obtained in the first stage, the mixture of ethylenically unsaturated monomers used in the second stage being chosen such that an exclusive polymerization of the mixture of ethylenically unsaturated monomers used in the second stage gives rise to a polymer having a glass transition temperature ($T_{G2}$) −60° to +20° C., wherein a mixture is used in the second stage which comprises (b1) 47 to 99% by weight of a cycloaliphatic or aliphatic ester of methacrylic aid or acrylic acid or a mixture of such esters, (b2) 1 to 20% by weight of a monomer which carries at least one hydroxyl group and is copolymerizable with (b1), (3), and (4), or a mixture of such monomers, (b3) up to 8% by weight of a monomer which carries at least one carboxyl or sulfonic acid group and is copolymerizable with (b1), (b2), and (b4), or a mixture of such monomers, and (b4) 0 to 25% weight of a further monomer which copolymerizable with (b1), (b2), and (b3), or a mixture of such monomer, the total of the weight percentages of (b1), (b2), (b3), and (b4) being always 100% by weight, the reaction conditions being chosen such that the resultant emulsion polymer has a number average molecular mass of 200,000 to 2,000,000, and the nature and amount of the mixture of monomers used in the first stage and the nature and amount of the mixture of monomers used in the second stage are chosen such that the resultant emulsion polymer has a hydroxyl value of 2 to 100 and the difference $T_{G1}-T_{G2}$ is 10° to 170° C.

7. The coating compositions as claimed in claim 2, wherein the basecoat composition or compositions comprises a metallic pigment.

8. A process for the preparation of a water thinnable emulsion polymer consisting of the steps of (a) polymerizing in a first stage 10 to 90 parts by weight of an ethylenically unsaturated monomer or a mixture of ethylenically unsaturated monomers in aqueous phase in the presence of one or more emulsifiers and one or more radical-forming initiators, wherein the resultant polymer has a glass transition temperature ($T_{G1}$) of +30° to +110° C., and wherein the monomer has no further limitation, and (b) polymerizing in a second stage 90 to 10 parts by weight of an ethylenically unsaturated monomer or a mixture of ethylenically unsaturated monomers, after at least 80% by weight of the monomer or the mixture of monomers used in the first stage has reacted, in the presence of the polymer obtained in the first stage, wherein the monomer or mixture of monomers used in the second stage is chosen such that an exclusive polymerization of the monomers used in the second stage gives rise to a polymer having a glass transition temperature ($T_{G2}$) of −60° to +20° C., the reaction conditions being chosen such that the resultant emulsion polymer has a number average molecular mass of 200,000 to 2,000,000, and the resultant emulsion polymer has a hydroxyl value of 2 to 100 and the difference $T_{G1}-T_{G2}$ is 10 to 170° C., the monomers having no further limitation.

9. The process as claimed in claim 1, wherein a mixture is used in the first stage which comprises (a1) 99.5 to 75% by weight of a cycloaliphatic or aliphatic ester of methacrylic acid or acrylic acid or a mixture of such esters, and (a2) 0.5 to 25% by weight of a monomer which is copolymerizable with (a1) or a mixture of such monomers, the total of the weight percentages of (a1) and (a2) being always 100% by weight.

10. The process as claimed in claim 1, wherein a mixture is used in the second stage which comprises (b1) 75 to 90% by weight of a cycloaliphatic or aliphatic ester of methacrylic acid or acrylic acid or a mixture of such esters, (b2) 5 to 15% by weight of a monomer which carries at least one hydroxyl group and is copolymerizable with (b1), (b3), and (b4), or a mixture of such monomers, (b3) 2 to 6% by weight of a monomer which carries at least one carboxyl or sulfonic acid group and is copolymerizable with (b1), (b2), and (b4), or a mixture of such monomers, and (b4) 2 to 15% by weight of a further monomer which is copolymerizable with (b1), (b2), and (b3), or a mixture of such monomers, the total of the weight percentages of (b1), (b2), (b3), and (b4) being always 100% by weight.

11. The emulsion polymer as claimed in claim 1, wherein a mixture is used in the first stage which comprises (a1) 99.5 to 75% by weight of a cycloaliphatic or aliphatic ester of methacrylic acid or acrylic acid or a mixture of such esters, and (a2) 0.5 to 25% by weight of a monomer which is copolymerizable with (a1) or a mixture of such monomers, the total of the weight percentages of (a1) and (a2) being always 100% by weight.

12. The emulsion polymer as claimed in claim 7, wherein a mixture is used in the second stage which comprises (b1) 75 to 90% by weight of a cycloaliphatic or aliphatic ester of methacrylic acid or acrylic acid or a mixture of such esters, (b2) 5 to 15% by weight of a monomer which carries at least one hydroxyl group and is copolymerizable with (b1), (b3), and (b4), or a mixture of such monomers, (b3) 2 to 6% by weight of a monomer which carries at least one carboxyl or sulfonic acid group and is copolymerizable with (b1), (b2), and (b4), or a mixture of such monomers, and (b4) 2 to 15% by weight of a further monomer which is copolymerizable with (b1), (b2), and (b3), or a mixture of such monomers, the total of the weight percentages of (b1), (b2), (b3), and (b4) being always 100% by weight.

13. The coating composition as claimed in claim 2, wherein the basecoat composition or compositions comprises an aluminum pigment.

14. The coating compositions as claimed in claim 2, wherein a mixture is used in the first stage which comprises (a1) 99.5 to 75% by weight of a cycloaliphatic or aliphatic ester of methacrylic acid or acrylic acid or a mixture of such esters, and (a2) 0.5 to 25% by weight of a monomer which is copolymerizable with (a1) or a mixture of such monomers, the total of the weight percentages of (a1) and (a2) being always 100% by weight.

15. The coating compositions as claimed in claim 2, wherein a mixture is used in the second stage which comprises (b1) 75 to 90% by weight of a cycloaliphatic or aliphatic ester of methacrylic acid or acrylic acid or a mixture of such esters, (b2) 5 to 15% by weight of a monomer which carries at least one hydroxyl group and is copolymerizable with (b1), (b3), and (b4), or a mixture of such monomers, (b3) 2 to 6% by weight of a monomer which carries at least one carboxyl or sulfonic acid group and is copolymerizable with (b1), (b2), and (b4), or a mixture of such monomers, and (b4) 2 to 15% by weight of a further monomer which is copolymerizable with (b1), (b2), and (b3), or a mixture of such monomers, the total of the weight percentages of (b1), (b2), (b3), and (b4) being always 100% by weight.

16. The process as claimed in claim 6, wherein a mixture is used in the first stage which comprises (a1) 99.5 to 75% by weight of a cycloaliphatic or aliphatic ester of methacrylic acid or acrylic acid or a mixture of such esters, and (a2) 0.5 to 25% by weight of a monomer which is copolymerizable with (a1) or a mixture of such monomers, the total of the weight percentages of (a1) and (a2) being always 100% by weight.

17. The process as claimed in claim 6, wherein a mixture is used in the second stage which comprises (b1) 75 to 90% by weight of a cycloaliphatic or aliphatic ester of methacrylic acid or acrylic acid or a mixture of such esters, (b2) 5 to 15% by weight of a monomer which carries at least one hydroxyl group and is copolymerizable with (b1), (b3), and (b4), or a mixture of such monomers, (b3) 2 to 6% by weight of a monomer which carries at least one carboxyl or sulfonic acid group and is copolymerizable with (b1), (b2), and (b4), or a mixture of such monomers, and (b4) 2 to 15% by weight of a further monomer which is copolymerizable with (b1), (b2), and (b3), or a mixture of such monomers, the total of the weight percentages of (b1), (b2), (b3), and (b4) being always 100% by weight.

* * * * *